US012738620B1

(12) United States Patent
Lu

(10) Patent No.: US 12,738,620 B1
(45) Date of Patent: Sep. 15, 2026

(54) SYSTEM AND METHOD FOR EFFICIENTLY GENERATING ELECTROMAGNETIC WAVES WITH REDUCED VELOCITIES

(71) Applicant: Weimin Lu, Novi, MI (US)

(72) Inventor: Weimin Lu, Novi, MI (US)

( * ) Notice: Subject to any disclaimer, the term of this patent is extended or adjusted under 35 U.S.C. 154(b) by 0 days.

(21) Appl. No.: 19/433,398

(22) Filed: Dec. 26, 2025

Related U.S. Application Data

(63) Continuation-in-part of application No. 19/208,804, filed on May 15, 2025, now Pat. No. 12,512,573.

(60) Provisional application No. 63/683,374, filed on Aug. 15, 2024.

(51) Int. Cl.
*H01P 3/06* (2006.01)
*H01P 1/18* (2006.01)
*H01P 3/127* (2006.01)

(52) U.S. Cl.
CPC .................. *H01P 3/06* (2013.01); *H01P 1/18* (2013.01); *H01P 3/127* (2013.01)

(58) Field of Classification Search
CPC ............... H01P 3/06; H01P 1/18; H01P 3/127
See application file for complete search history.

(56) References Cited

FOREIGN PATENT DOCUMENTS

JP 2019/002752 A 1/2019

*Primary Examiner* — Andrea Lindgren Baltzell
*Assistant Examiner* — Kimberly E Glenn
(74) *Attorney, Agent, or Firm* — Carrier, Shende & Associates P.C.; Joseph P. Carrier; Fulchand P. Shende

(57) ABSTRACT

A system for efficiently generating a tailored electromagnetic (EM) wave having a lower velocity than the speed of electromagnetic waves in free space includes a parallel-plate waveguide which extends linearly and a sinewave current generator. The parallel-plate waveguide includes a ground plate and a tailored transmitting antenna plate disposed in parallel and spaced apart. The ground plate is formed of a first conductor. The tailored transmitting antenna plate is constructed physically and electrically by at least three phase-shifted sub-antennas connected in series, each of the sub-antennas being formed of a second conductor which has relatively high resistance. The ground plate and the antenna plate define a space therein which may be maintained as vacuum. The sinewave current generator generates multiple phase-shifted sinewave currents which are respectively input to the sub-antennas.

20 Claims, 11 Drawing Sheets

SYSTEM AND METHOD FOR EFFICIENTLY GENERATING ELECTROMAGNETIC WAVES WITH REDUCED VELOCITIES

CROSS REFERENCE TO RELATED APPLICATIONS

The present application is a continuation-in-part of U.S. patent application Ser. No. 19/208,804, filed May 15, 2025, which claims priority from U.S. Provisional Patent Application 63/683,374, filed Aug. 15, 2024. The entire disclosures of these prior applications are incorporated herein by reference.

FIELD OF THE INVENTION

The present invention pertains to systems and methods for efficiently generating or originating tailored electromagnetic (EM) waves having lower velocities than the speed of EM waves in free space (the speed of light), which EM waves having the lower velocities can be advantageously used in many applications. More particularly, the present invention pertains to such system and method in which the tailored EM waves are originated within a coaxial or a parallel-plate waveguide in which a vacuum may be maintained as the dielectric medium and the EM waves, in any of various modes including TEM, TE and TM modes, propagate linearly along the longitudinal direction of the waveguide, such that there is no dielectric EM energy loss due to vacuum and no directional EM energy loss due to longitudinal propagation, and with minimal mode conversion loss of EM energy due to conversion mismatch, as well as with reduced manufacturing costs.

BACKGROUND ART

Slow phase velocity of EM waves in radio wave frequency may range from 3 KHz to 300 GHz, with such waves being known as slow EM waves and have many useful applications. For example, use of slow EM waves makes is possible to reduce sizes for high-performance resonators and filters in RF and microwave communication systems. Slow EM waves can improve the resolution of radar systems by increasing the interaction time. Slow EM waves can increase energy dissipation and enhance electromagnetic shielding or stealth capabilities. Slow EM waves can improve resolution and penetration depth in medical imaging systems. Slow EM waves can improve the sensitivity and accuracy of diagnostic tools in plasma behavior. Slow EM waves can enhance sensitivity in microwave-based quantum sensors for detecting magnetic or electric fields. Slow EM waves enable microwave heating more uniform and efficiently in processing of materials like ceramics, polymers, or food.

As known, an oscillating sinewave current on a conductor produces an oscillating electric field which further produces an oscillating magnetic field, which in turn becomes a new source of electric field. Hence, an electromagnetic (EM) wave is generated on the conductor and propagated in a dielectric medium such as air, vacuum, insulating materials, etc. The directions of an oscillating electric field and an oscillating magnetic field are perpendicular to each other, and a propagating direction of the EM wave is perpendicular to both electric and magnetic fields. Every dielectric medium, including air and vacuum, has a velocity of EM wave, called "phase velocity" that is a constant and independent of the wavelength of an EM wave. In free space, phase velocity of an EM wave is equal to the speed of light. All other dielectric media have smaller phase velocities than the speed of light.

Currently there are four known methods for slowing down phase velocity of an EM wave in radio wave range or microwave range (which excludes light, a type of EM wave) inside a waveguide. The first known method is conventional and uses special dielectric medium or metamaterial inside the waveguide. A disadvantage to this known method is dielectric medium loss of the energy of the slowed EM wave. The slower the phase velocity is, the greater the loss of EM energy is. Because photons of the EM wave have to collide with the special dielectric material or metamaterial, the photons give up some energy based on these collisions. Also the greater the density of the special dielectric medium or metamaterial, the higher the dielectric loss of the EM energy is.

The second known method uses helical or spiral propagation, rather than axial propagation of an EM wave inside a waveguide. A disadvantage of this known method is directional energy loss. Because the direction of energy flux, also known as "Poynting vector", of the EM wave is not in the axial direction of the waveguide, only partial electromagnetic (EM) energy propagates.

The third known method uses a combination of both metamaterial medium and helical propagation for greater reduction of phase velocity, but again at the expense of a greater EM energy loss.

The forth known method uses multiple conductive obstacles inside a waveguide to slow down EM wave propagations at even greater EM energy loss.

All four of the known methods involve electromagnetic (EM) energy loss. A few specific examples based on the known methods are discussed in the following references.

U.S. Pat. No. 11,296,804,B2 to Chopra et al. discloses phased array antenna plates in a circular arrangement with multiple frequencies.

U.S. Pat. No. 9,472,838,B2 to McKinzie III discloses phased array of conductive obstacles inside a waveguide to slow down EM waves.

U.S. Pat. No. 8,482,478 B2 to Abraham Hartenstein discloses an antenna plate array in circular housing configuration where multiple antenna plates are connected to a single signal source.

U.S. Pat. No. 8,208,191 B2 to Gan et al. discloses a series different grading structure to slow down light (EM wave) in propagation through the structure.

US Patent Application Pub. No. 2006/0280407A1 to Montgomery et al. discloses a spiral resonant waveguide to slow light (EM wave) in propagation.

NASA 1997 Contactor Report 4766 by Carol L. Kory titled "Validation of An Accurate Three-Dimensional Helical Slow-Wave Circuit Model" discloses a helical structure to slow down microwave propagations.

Each of the methods disclosed in these references involve use of at least one of the known methods for slowing down phase velocity of an EM wave inside a waveguide while sacrificing some of the energy of an EM wave, again, because they involve use of dense metamaterial media as the dielectric media in which the EM wave travels. Metamaterials interact with photons of the EM wave or they involve use of spiral Poynting vector (direction of energy flux) or they involve use of obstacles to slow down the phase velocity of an EM wave inside a waveguide at expenses of losses of energy the energy of an EM wave.

Thus, a need still exists in the art for a system and method which can more effectively and efficiently generate EM waves having lower velocities than the speed of EM waves in free space without incurring significant EM energy loss, as well as reducing manufacturing cost and improved flexibility in terms of using different modes of an EM wave.

SUMMARY OF INVENTION

An object of the present invention is to satisfy the discussed need.

The present invention creates new systems and methods to dramatically slow down the phase velocity of an EM wave inside a coaxial wave guide or a parallel-plate waveguide without dielectric medium energy loss and without directional energy loss. The present invention is able to achieve this objective based on the unique structures of the waveguides discussed herein, and because each of the waveguides uses vacuum as the dielectric medium inside the waveguide and the direction of energy flux is generated in the longitudinal direction of the waveguide.

Coaxial Waveguides

According to a first aspect of the present invention, a tailored slow EM (electromagnetic) wave is originated and propagated within a coaxial waveguide. Such coaxial waveguide may include a tubular outer conductor and a tailored emitting antenna shaped as a long, straight/linear rod disposed inside of the waveguide and constructed of multiple phase-shifted sub-antennas connected physically and electrically in series. Every sub-antenna may be identical and in shape and should have a relatively higher resistance compared to a lower resistance of the outer conductor so that each sub-antenna will provide some electrical resistance. For example, each sub-antenna may be a short piece of straight rod made of relatively low conductive material, like chromium, titanium so that each sub-antenna can have voltage potential difference due to some electrical resistance of the material. The relatively higher resistance of the sub-antennas could be achieved in other manners than the material used in forming the sub-antennas, e.g., a particular structure of the sub-antennas. All sub-antennas are physically and electrically connected in series collectively forming the long straight rod as the tailored antenna so that electric current can carry through the antenna from a beginning point to an ending point of the tailored antenna, may be connected to while a resistive load may be connected to the ending point of the tailored antenna.

Further the system of the present invention may include a unique, multiple phase-shifted sinewave current generator that is electrically connected to all of the sub-antennas by feed lines. The feed lines may be connected between the current generator and the sub-antennas from a side of the waveguide or, if the antenna is hollowed rod, from a center of tailored antenna.

According to a second aspect of the present invention, the sub-antennas get sinewave currents in phase-shifted sequences from the multiple phase-shifted sinewave current generator so that the tailored antenna collectively forms the tailored EM wave within the coaxial waveguide. In vacuum, a preferred dielectric material for use within the waveguide, an effective velocity of an EM wave is the traveling or propagating speed of the tailored EM wave. A physical distance on the tailored antenna between the connecting points of the sub-antennas with same phase defines an effective wavelength of the tailored EM wave, and is thus based on the linear, longitudinal length of the sub-antennas. The effective wavelength may be selected by design and is independent of the frequency and the effective velocity of the EM wave. Some electrical resistance of the sub-antenna permits and builds up voltage potential difference between adjacent sub-antennas. The effective velocity is slower than speed of light in free space.

According to a third aspect of the present invention, the tailored EM wave exists in near field within a coaxial waveguide configuration similar to a common coaxial cable. The coaxial waveguide has the tailored antenna extending along its center axis and carries sinewave current from a beginning point of the antenna to an ending point where an end load may be connected. An electric field is generated radially towards and perpendicular to the outer conductor of the coaxial waveguide and a magnetic field is generated circularly around and perpendicular to tailored antenna. And these electric field and magnetic field are generated by alternative sinewave current on the tailored antenna, which results in the electromagnetic (EM) wave that linearly propagates within the waveguide towards the end load. Because the direction of propagation or Poynting vector (direction of energy flux) is always orthogonal to both electric field and magnetic field, the direction of propagation of the EM wave is in the axial direction of the waveguide. Therefore there is no directional EM energy loss in the tailored EM wave inside the waveguide, as well as no EM energy loss because the dielectric medium within the waveguide is vacuum.

According to a fourth aspect of the present invention, according to another embodiment, a tailored antenna may be constructed in a circumference of the waveguide, while an internal conductor is disposed inward of the tailored antenna along a central axis of the waveguide.

Parallel Plate Waveguides

According to a fifth aspect and embodiment of the present invention, a tailored slow EM wave is originated and propagated within a parallel-plate waveguide, rather than within a coaxial waveguide, such as discussed in relation to the first-fourth aspects of the present invention. A parallel plate waveguide provides additional advantages that are not provided by a coaxial waveguide, as discussed further herein. The multiple phase-shifted sinewave current generator used in relation to the coaxial waveguides may also be used together with the parallel plate waveguides.

Such parallel-plate waveguide may include a long straight, planar plate as a conductive ground plate and a tailored transmitting antenna plate shaped as a long, straight, planar plate disposed in parallel to and spaced from the ground plate of the waveguide. The tailored transmitting antenna plate is constructed of multiple phase-shifted sub-antennas connected physically and electrically in series along a longitudinal direction of the waveguide. Every sub-antenna plate may be identical and in shape of a short piece of straight plate may be made of a conductive material and/or in such a form so that it has a relatively high resistance, so that each sub-antenna plate can have voltage potential difference due to some electrical resistance of the material. All of the sub-antennas are physically and electrically connected in series collectively forming the long straight, planar plate as the tailored antenna plate so that electric current can carry through the antenna plate from a beginning point to an ending point of the tailored antenna plate. Again, the system of the present invention including the parallel plate waveguide may also include the same unique, multiple phase-shifted sinewave current generator discussed for use with the coaxial waveguides. Such multiple phase-shifted sinewave current generator may be electrically connected to all of the sub-antennas by respective feed lines. The feed lines may be connected between the current generator and the sub-antennas from a side of the waveguide or, if the antenna plate is hollowed plate, from inside of tailored antenna plate.

According to a another aspect of the present invention, the sub-antennas receive sinewave currents in phase-shifted sequences from the multiple phase-shifted sinewave current generator so that the tailored antenna plate collectively forms the tailored EM wave within an internal space of the parallel-plate waveguide. If the internal space of the waveguide is maintained in vacuum, an effective velocity of the tailored EM wave is the traveling or propagating speed of the tailored EM wave. A physical distance on the tailored antenna plate between two of the sub-antennas with same phase defines an effective wavelength of the tailored EM wave, and is thus based on the linear length of the sub-antennas with same phase. The effective wavelength may be selected by design and is independent of the frequency and the effective velocity of the tailored EM wave. Due to the fact that the sub-antenna plates have some electrical resistance, this permits a build up of voltage potential difference between adjacent sub-antennas. The effective velocity is slower than the speed of EM waves in free space.

According to another aspect of the present invention, the tailored EM wave exists in near field within the parallel-plate waveguide configuration similar to a common parallel-plate waveguide. The parallel-plate waveguide according to the present invention has the tailored antenna plate extending along its longitudinal direction and carries sinewave current from a beginning point of the antenna plate to an ending point where an end load, such as a resistive load, is connected. The tailored antenna plate may be constructed physically and electrically by the multiple sub-antennas connected in series, where each of the sub-antennas produces a section or portion of the tailored EM wave from the sinewave currents in phase-shifted sequences provided by the multiple phase-shifted sinewave current generator. An electric field is generated towards and perpendicular to the ground plate and a magnetic field is generated in parallel to the ground and antenna plates and in transverse direction to the parallel-plate waveguide in, for example, TEM mode. These electric and magnetic fields are generated by alternative sinewave current on the tailored antenna plate, which results in the EM wave that longitudinally propagates within the waveguide towards the end load. Because the direction of propagation or Poynting vector (direction of energy flux) is always orthogonal to both electric and magnetic fields, the direction of propagation of the EM wave is in the longitudinal direction of the waveguide. Therefore there is no directional EM energy loss in the tailored EM wave inside the waveguide, and when the internal space of the waveguide is maintained in vacuum no dielectric EM energy loss results due to the vacuum.

According to another aspect and embodiment of the present invention, a tailored antenna plate waveguide may be configured in a sandwich structure. In one such structure, the tailored antenna plate is sandwiched between two ground plates, which is technically called a Stripline waveguide. In another such structure, multiple tailored antenna plates are spaced from each other and sandwiched between two ground plates, which is technically called Microstrip waveguide.

The systems and methods of the present invention involving the parallel plate waveguide provide important advantages over the known, conventional systems and methods for slowing down phase velocity of an EM wave in radio wave range or microwave range, including those previously discussed in relation to the inventor's systems and methods involving coaxial waveguide structures for efficiently generating EM waves with reduced velocities. Additionally, the systems and methods of the present invention involving the parallel plate waveguide provide further advantages over the inventor's systems and methods involving the coaxial waveguide structures.

For example, parallel plate waveguide in the exemplary embodiments of the present invention have clear, open, internal space between the two plate conductors, but with the coaxial waveguide structures, these may include a centrally disposed conductor or conduit, which physically obstructs some applications of EM waves.

As another example, the parallel plate waveguides in the exemplary embodiments of the present invention can transmit essentially all modes of an EM wave, including TEM, TE and TM modes, such that any energy loss due to conversion between different modes is kept to a minimum. On the other hand, the coaxial waveguide structures can only transmit in true TEM mode of an EM wave. Thus, if and when it becomes necessary to connect two different modes of EM wave between two waveguides there may be a large conversion energy loss due to mode mismatch.

Further, manufacturing cost of parallel plate waveguide may be much lower than that of a coaxial waveguide. The relatively larger size of the plates makes them easier to work with in comparison to the coaxial waveguide structures, including elimination of any need to properly dispose the central conductor or conduit of the coaxial waveguide, which typically requires much greater precision in comparison to disposing plates in parallel.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DETAILED DESCRIPTION OF THE PRESENT ILLUSTRATIVE EMBODIMENTS

Figure 1:
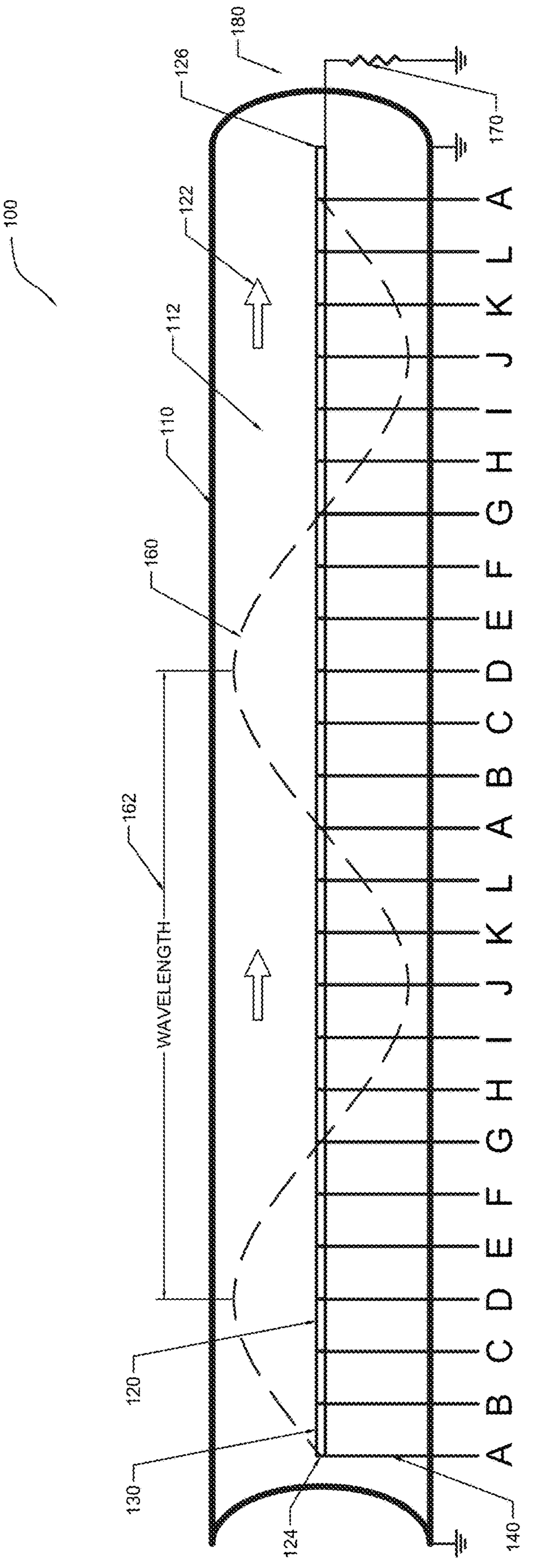
FIG. 1 is a side, sectional view of an exemplary embodiment of a coaxial waveguide according to the present invention and a tailored electromagnetic (EM) wave within the waveguide.

A number of selected illustrative embodiments of a coaxial waveguide or a parallel plate waveguide, each of which may be combined together with an illustrative embodiment of a multiple phase-shifted sinewave current generator, to collectively constitute systems according to the present invention for efficiently generating or originating tailored electromagnetic (EM) waves having lower velocities than conventional electromagnetic waves, as well as corresponding methods for efficiently generating or originating the tailored EM waves according to the present invention, will now be described in some detail with reference to the drawings. It should be understood that only structures considered necessary for a person of ordinary skill in the art to have a clear understanding of the present invention are described herein. Other conventional structures that may be used as parts of or together with the disclosed embodiments, and those of ancillary and auxiliary components of the system according to the present invention are known and understood by those skilled in the art. For example, all non-electrical structures that support a tailored antenna inside a waveguide in the exemplary embodiments of the present invention are omitted to simplify the illustration.

Terminology Used Herein

EM wave: Electromagnetic wave.

Antenna: An antenna referred in present invention is an emitting antenna that converts an alternating electric current into EM wave.

Free Space: Free space is a region where there is perfect vacuum, with no matter, no electromagnetic field and no charged particles, and a reference point for physics.

Dielectric medium: Dielectric medium is a medium material in which an EM wave travels or propagates through. Dielectric mediums include vacuum, air, most dielectric insulation materials, metamaterials, etc. When the dielectric medium is a vacuum, the present disclosure will clearly state this. Vacuum is different from free space.

Frequency of EM wave: Frequency is a scalar number that refers to the number of alternating cycles per second of an electromagnetic (EM) wave.

Wavelength of EM wave: Wavelength is the distance between two points of the same phase on an EM wave.

Effective wavelength of EM wave: An effective wavelength of the EM wave refers to the wavelength of a tailored EM wave in present invention.

Speed (velocity) of EM wave in free space: The speed of EM wave in free space equals to the speed of light (c) in free space, which is $3\times10^{8}$ m/s.

Phase velocity of EM wave: Phase velocity is a vector number that refers to traveling or propagating speed of an EM wave in a confined dielectric medium.

Effective velocity of EM wave: Effective velocity is a vector number that refers to traveling or propagating speed of a tailored EM wave in a dielectric medium in present invention.

Slow wave (or slow EM wave or slow light): Slow wave refers the phase velocity of an EM wave (or light) in a confined medium, having a velocity which is slower than the speed of light.

Embodiments With Coaxial Waveguides

First Illustrative Embodiment

Figure 2:
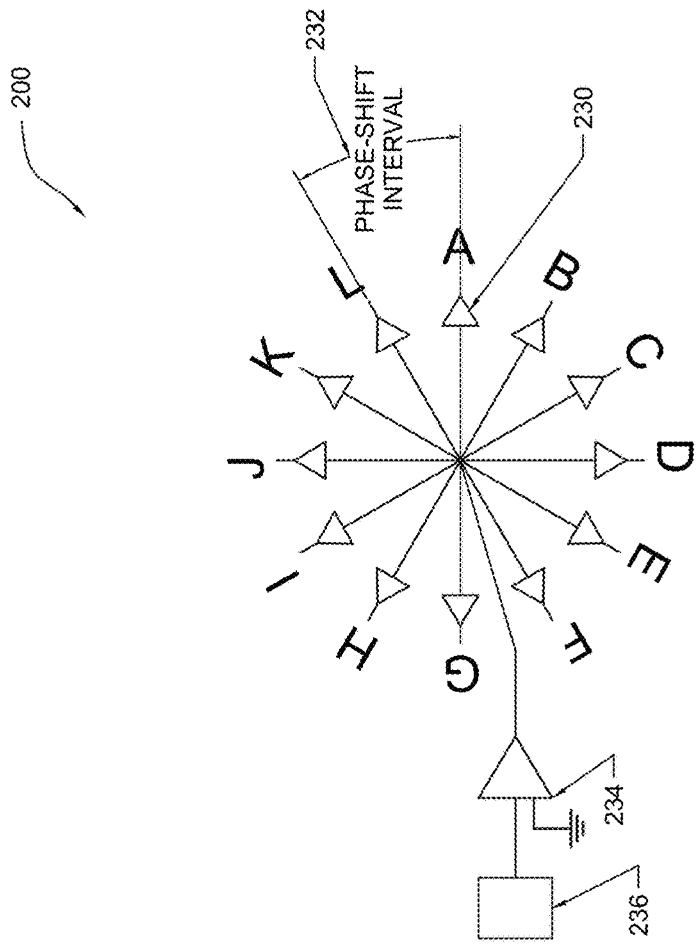
FIG. 2 is a schematic view of an exemplary embodiment of a logic circuit diagram of a multiple phase-shifted sinewave current generator according to the present invention, which generator functions together with the coaxial waveguide of FIG. 1 to generate the tailored EM wave.

A coaxial waveguide 100 depicted in FIG. 1 and a multiple phase-shifted sinewave current generator 200 depicted in FIG. 2 jointly constitute a system according to a first exemplary embodiment of the present invention.

Referring to FIG. 1, there is shown a side, sectional view of an exemplary embodiment of a coaxial waveguide 100 and a tailored emitting antenna 120 disposed within the waveguide 100, which are two of three main parts of a system according to the present invention for efficiently generating or originating tailored electromagnetic (EM) waves having lower velocities than conventional electromagnetic waves. FIG. 1 also shows in broken lines a tailored electromagnetic (EM) wave 160 which originates within the waveguide.

As depicted, the coaxial waveguide 100 may be a closed, half-pipe or tubular member having an internal space 112 which is maintained in vacuum, while outside the waveguide 100 is free space 180. An outer circumference or wall 110 of the waveguide 100 may be a conductor made of highly conductive material, like copper, aluminum, etc. with a cross-sectional shape of round tube, square tube, etc.

The tailored emitting antenna 120 may be disposed within the waveguide 100 such that it extends along a central axis of the waveguide and may be shaped as an elongate straight rod functioning as a center conductor of the coaxial waveguide 100. According to an important aspect of the present invention, the emitting antenna 120 may be constructed electrically and mechanically using three or more phase-shifted sub-antennas 130 connected in series. The depicted emitting antenna 120 includes twenty five (25) sub-antennas 130 in total, with twelve (12) of the sub-antennas 130 in one cycle of the originated EM wave 160. Every sub-antenna 130 may be identical and have relatively higher resistance than the waveguide conductor. For example, each sub-antenna 130 may be in the shape of a short piece of straight rod made of relatively low conductive material, like chromium, titanium, etc., although the relatively higher resistance could be achieved in other manners using other materials based on the particular shape and construction of the sub-antennas. By being formed with such relatively higher resistance, each sub-antenna 130 can have voltage potential difference due to some electrical resistance of the sub-antenna. All of the sub-antennas 130 are physically and electrically connected in series, and collectively form a long straight rod as the tailored emitting antenna 120 that can carry electric current of the originated EM wave therethrough from a beginning point or first end 124 to an ending point or opposite end 126 of the antenna.

Referring to FIG. 2, the third main part of the system according to the present invention for efficiently generating or originating tailored electromagnetic (EM) waves having lower velocities than conventional electromagnetic waves may be a unique sinewave current generator 200 which generates multiple phase-shifted sinewave currents and respectively inputs such phase-shifted sinewave currents to the sub-antennas 130. The sub-antennas may be electrically connected to the sinewave current generator by respective side feed lines 140, as shown in FIG. 1. The waveguide outer conductor 110 and the current generator 200 may each be connected to ground, and are electrically connected together.

FIG. 2 depicts a logic circuit diagram of the multiple phase-shifted sinewave current generator 200, which includes a power supply 236, a main signal generator 234 and a plurality of phase shifters 230. The multiple phase-shifted sinewave current generator 200 may be configured at a single frequency and has multiple phase-shifted sinewave current outputs labeled as A, B, C . . . L which correspond in number to the plurality of phase shifters 230. These current outputs connect and input the sinewave current to the tailored antenna 120 on each sub-antenna 130 through the respective feed lines 140. The outputs of the sinewave current generator 200 may each have the same amplitude, but the outputs have phase-shifted sequences such as A, B, C, . . . . L. The intervals of phase-shift on all input sinewave currents are same, such as 30° for twelve sub-antennas in one cycle (as illustrated), 120° for an antenna including three sub-antennas in one cycle, etc. The smaller interval of phase-shift is, the better the tailored EM wave 160 that can be generated by the system. The power supply 236 supplies power to the main signal generator 234 with a selected single frequency. The main signal generator 234 provides an oscillating sinewave current to all phase shifters 230 which sequentially shift a phase of the sinewave currents at equal intervals in one cycle. The current outputs are labeled A, B, C . . . L of the current generator 200.

The sinewave current generator 200 only determines the frequency of the current, not an effective wavelength 162 of the tailored EM wave originated/generated in the coaxial waveguide. Therefore the coaxial waveguide 100 must pair with the current generator 200 to create the tailored EM wave at desired effective velocity 122 of the tailored EM wave 160.

According to an important aspect of the present invention, the multiple phase-shifted sinewave current generator 200 is configured so that it respectively inputs, at single frequency, a phase-shifted sequence of sinewave currents to the sub-antennas 130 of the tailored antenna 120 through the feed lines 140 associated with the sub-antennas. In the depicted embodiment, the phase-shifted sequence involves twelve (12) intervals A, B, C . . . L.

When the sub-antennas 130 receive the sinewave currents in phase-shifted sequences the tailored antenna 120, consisting of the multiple sub-antennas 130, collectively originates and forms the tailored EM wave 160 within the coaxial waveguide 100. The internal space 112 of the waveguide 100 is preferably vacuum, so that the traveling or propagating speed of the tailored EM wave 160 is its effective velocity 122. A physical distance on the tailored antenna 120 between connecting points of the sub-antennas 130 with same phase defines or determines an effective wavelength 162 of the tailored EM wave 160. The effective wavelength 162 is selectable by design of the tailored antenna 120 and is independent to the frequency and the effective velocity 122 of the tailored EM wave 160. The length of the waveguide 100 should be at least twice as long as the effective wavelength 162 to minimize harmonic frequencies, and in the depicted embodiment the tailored antenna 120 including twenty five sub-antennas 130 is more than twice as long as the effective wavelength 162. Some electrical resistance of the sub-antenna 130 permits and builds up voltage potential difference between adjacent sub-antennas. If too little electrical resistance were between the adjacent sub-antennas, adjacent phase-shifted currents could be distorted, whereas if too much electrical resistance were between the adjacent sub-antennas, the current flow of the tailored EM wave could be limited.

The tailored EM wave 160 exists in near field within the coaxial waveguide 100 configuration similar to a common coaxial cable. The coaxial waveguide 100 includes the tailored antenna 120 which is disposed along the waveguide's center axis and carries alternating sinewave current of the originated/generated, tailored EM wave 160 from the beginning point 124 to the ending point 126 of the antenna, where an end load 170 is connected. An electric field is generated radially towards and perpendicular to the outer conductor 110 of the waveguide and a magnetic field is generated circularly around and perpendicular to the tailored antenna 120 by the alternating sinewave current on the tailored antenna 120. This results from the EM 160 wave that propagates within the waveguide 100 towards the end load 170. Because the direction of propagation vector or Poynting vector of the EM wave 160 is always orthogonal to both electric field and magnetic field, the direction of propagation is in the axial direction of the waveguide. Therefore, the present invention is advantageously different from the Background Art discussed above because there is no directional EM energy loss in the tailored EM wave 160 inside the waveguide 100. Also because the internal space of the coaxial waveguide 100 is vacuum 122, the present invention is advantageously different from the Background Art discussed above because no EM energy loss occurs in vacuum. The tailored EM wave 160 cannot exist outside the waveguide 100 in free space 180.

The present invention uniquely, efficiently generates or originates tailored electromagnetic (EM) waves 160 having lower velocities than conventional EM waves wave within the coaxial waveguide 100. In other words, the present invention efficiently originates or generates a relatively slow EM wave. As discussed above, the efficiency results because there is no directional EM energy loss in the tailored EM wave 160 which linearly propagates within the coaxial waveguide 100, and because there is no EM energy loss due to use of vacuum as the dielectric medium within the coaxial waveguide 100 according to the present invention, rather than denser dielectric materials which are conventionally used to slow the velocity of a conventional EM wave. Just as a conventional EM wave passing through a denser dielectric medium within a conventional waveguide has slower phase velocity than the speed of light (c) in free space, the effective velocity ($v_e$) 122 of the propagating tailored EM wave 160 in vacuum 112 within the coaxial waveguide 100 of the present invention is the frequency (f) times the effective wavelength ($\lambda_e$). That is, $v_e = f \cdot \lambda_e$ may be much smaller than the speed of light (c) in free space. Conventional use of a dielectric medium that is denser than vacuum or even metamaterial dielectric medium to slow down the velocity of EM wave inside a waveguide will typically consume some of the energy of the EM wave. In contrast, the present invention preferably uses vacuum as the dielectric medium within the waveguide 100 because vacuum as the dielectric medium doesn't consume energy of EM wave.

The tailored EM wave generated using the system and method of the present invention has an effective phase velocity 122 which may be designed several orders of magnitude smaller than the speed of light (c) in free space, e.g., 10 to 100,000.

The coaxial waveguide 100 according to the above discussed embodiment may be modified in various ways. For example, the tailored antenna 120 need not be constructed of multiple sub-antennas 130 joined sequentially together in a linear arrangement. According to a possible modification to the above discussed embodiment, the tailored antenna 120 can also be constructed by a continuously long straight rod made of relatively low conductive material, like chromium, titanium on which the feed lines are physically and electrically connected in sequence with equal segment lengths between the adjacent feed lines. Each segment of the continuously long straight rod is effectively a sub-antenna so that the tailored antenna 120 according to this modification would still effectively constructed by multiple phase-shifted sub-antennas connected in series. Also, the interior space of the coaxial waveguide 100 is in vacuum for minimizing energy loss. However, any dielectric medium other than vacuum may be used to fill the interior space within the coaxial waveguide 100, but this would result in some energy loss.

Second Illustrative Embodiment

Figure 3:
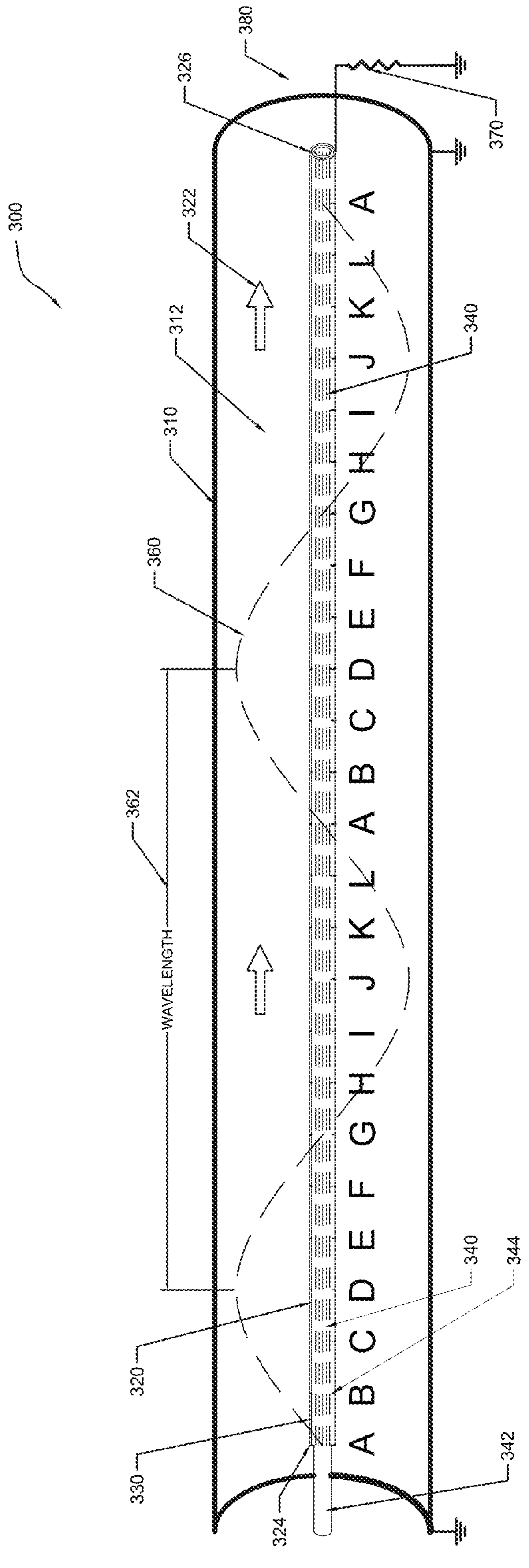
FIG. 3 is a side, sectional view of another exemplary embodiment of a coaxial waveguide according to the present invention and a tailored electromagnetic (EM) wave within the waveguide.

Referring to FIG. 3 there is shown a coaxial waveguide 300 according to a second illustrative embodiment of the present invention. Primary differences between this second embodiment and the first embodiment discussed above pertain to the structure of a tailored emitting antenna 320 and feed lines 344 that provide multiple phase-shifted sinewave current outputs to sub-antennas 330 of the tailored emitting antenna 320.

FIG. 3 is a side, sectional view of the coaxial waveguide 300 according to the second embodiment of the present invention, wherein a tailored EM wave 360 that originates within the waveguide 300 is shown in broken lines. The coaxial waveguide 300 includes many features which are common to the coaxial waveguide 100 of the first embodiment, including that internal space 312 of the waveguide is vacuum, outside the waveguide 300 is free space 380, an outer conductor 310 of the waveguide 300 is made of highly conductive material, like copper, aluminum, etc. in shape of a round tube, square tube, etc., a tailored emitting antenna 320 is in the shape of a long straight rod functioning as a center conductor of the coaxial waveguide 300 and is constructed electrically by at least three, phase-shifted sub-antennas 330 in series, the antenna 320 as illustrated includes twelve sub-antennas 330 in one cycle, all of the sub-antennas 330 are identical and in shape and made to have relatively higher resistance than that of the conductor, e.g., each sub-antenna may be made of relatively low conductive material, like chromium, titanium, so that each sub-antenna 330 can have voltage potential difference due to some electrical resistance of the material, all sub-antennas 330 are physically and electrically connected in series collectively forming a long straight rod as the tailored antenna 120 that can carry electric current through from a beginning point 324 of the antenna to an ending point 326 of the antenna.

The tailored emitting antenna 320 is different from the tailored emitting antenna 120 of the first embodiment in the following respects. First, the antenna 320 is hollow and each of the sub-antennas 330 forming the antenna is of a short piece of straight hollowed rod. Second, feed lines 340, which respectively provide phase-shifted sinewave current outputs from a multiple phase-shifted sinewave current generator such as the generator 200 in FIG. 2, are bundled together 342 and are disposed inside the hollow tailored antenna 320. The bundled feed lines 342 may enter the hollow antenna 320 from one end of the antenna nearest to a beginning point 324 of the antenna, rather than through a side wall of the waveguide as in the first embodiment, and then extend through the hollow antenna to the ending point 326 of the antenna so that electric field together sums zero inside the linear, hollow tailored antenna 320. Inside the hollow antenna each of the centrally disposed feed lines 340 branches out as 344 and respective, electrically connect to the sub-antenna 330 by phase-shift sequence A, B, C . . . L, similar to the respective connections of the side feed lines 140 to the phase shifted sub-antennas 130 in the first embodiment. The grounded outer conductor 310 and the grounded current generator 200 are connected together just as the grounded outer conductor 110 is connected to the grounded current generator 200 in the first embodiment.

As a modification to the second embodiment, the tailored emitting antenna 320 may alternatively be constructed by a continuously long straight hollowed rod made of relatively low conductive material, like chromium, titanium on which feed lines providing phase-shifted sinewave current outputs from the generator 200, such as the feed lines 340, are physically and electrically connected in sequence with equal length/size segments of the continuously long straight hollowed rod antenna between the adjacent feed lines. Each segment of the continuously long straight hollowed rod antenna is effectively a sub-antenna so that the tailored antenna 320 is still effectively constructed by multiple phase-shifted sub-antennas connected in series.

Third Illustrative Embodiment

Figure 4:
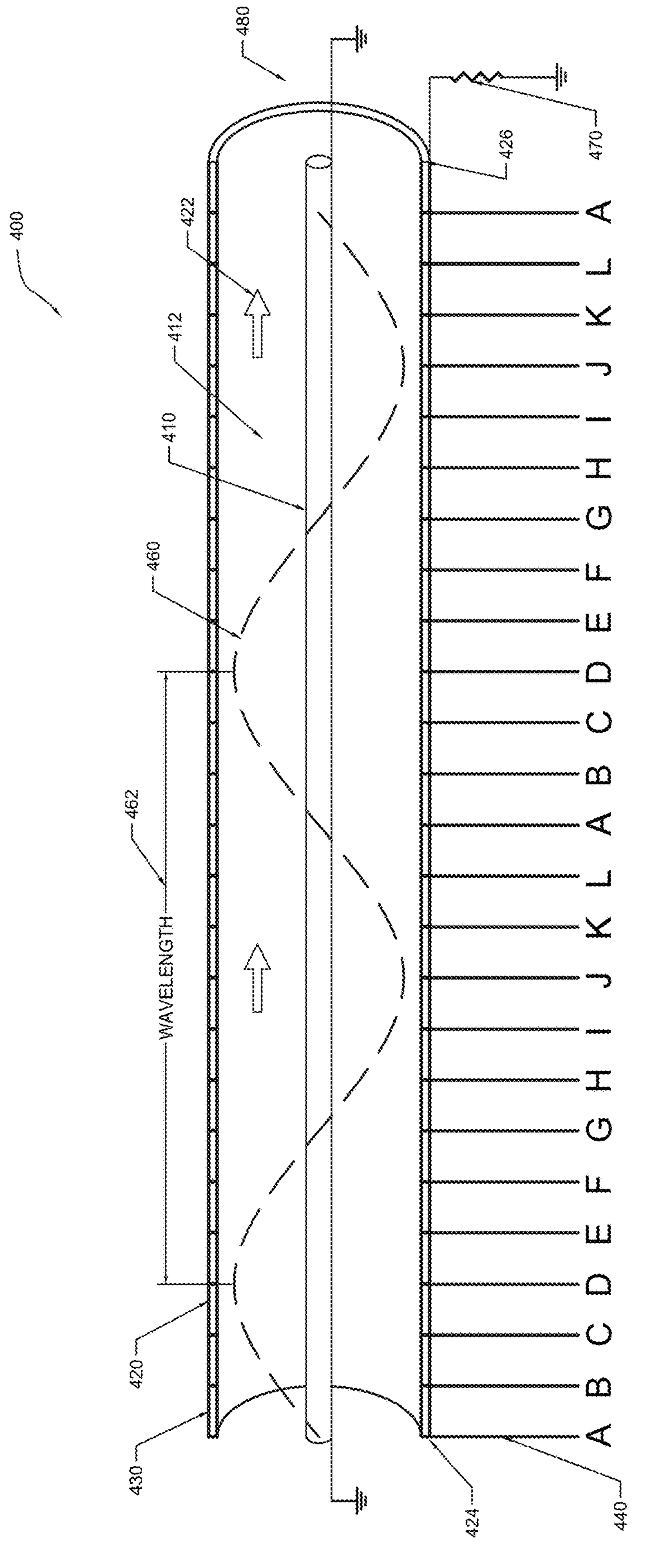
FIG. 4 is a side, sectional view of still another exemplary embodiment of a coaxial waveguide according to the present invention and a tailored electromagnetic (EM) wave within the waveguide.

Referring to FIG. 4 there is shown a coaxial waveguide 400 according to a third illustrative embodiment of the present invention. Primary differences between this third embodiment and the first embodiment discussed above pertain to the structure of a tailored emitting antenna 420 and a conductor 410 of the coaxial waveguide. Essentially, the positioning of the antenna 420 and the conductor 410 are reversed in comparison the tailored emitting antenna 120 and conductor 110 of the coaxial waveguide 100 of the first embodiment such that the tailored emitting antenna 420 forms the outer portion of the waveguide 400 and the conductor 410 forms an internal portion of the waveguide 400 extending linearly along a central axis of the waveguide 400, which is reverse to the internal positioning of the antenna 120 and the outer positioning of the conductor 110 in the coaxial waveguide 100.

FIG. 4 is a side, sectional view of the coaxial waveguide 400 according to the third embodiment of the present invention, wherein a tailored EM wave 460 that originates within the waveguide 400 is shown in broken lines. The coaxial waveguide 400 includes many features which are common to the coaxial waveguide 100 of the first embodiment, including that internal space 412 of the waveguide 400 is vacuum, outside the waveguide 400 is free space 480, the conductor 410 of the waveguide 400 is made of highly conductive material, like copper, aluminum, etc., the tailored emitting antenna 420 is elongate, linear and is constructed electrically by at least three, phase-shifted sub-antennas 430 in series, the illustrated embodiment includes twelve sub-antennas 430 in one cycle, all of the sub-antennas 430 are identical and have relatively higher resistance than that of the conductor, e.g., by being made of relatively low conductive material, like chromium, titanium, so that each sub-antenna 430 can have voltage potential difference due to some electrical resistance of the material, all of the sub-antennas 430 are physically and electrically connected in series collectively an elongate linear member as the tailored antenna 420 that can carry electric current through from a beginning point 424 to an ending point 426, and all of the sub-antennas 430 are electrically connected by side feed lines 440 to a multiple phase-shifted sinewave current generator such as the generator 200 in FIG. 2.

The tailored emitting antenna 420 is different from the tailored emitting antenna 120 of the first embodiment in the following respects. First, the antenna 420 is hollow and each of the sub-antennas 430 forming the antenna is of a short piece of the straight outer circumference of the coaxial waveguide 400. Second, the conductor 410 is a solid rod extending along the central axis of the waveguide. Also, a beginning point 424 of the conductor extends outward of the enclosed interior space of the coaxial waveguide 400, and both the beginning point 424 and an ending point 426 of the conductor are connected to ground.

As a modification to the third embodiment, the tailored antenna 420 may alternatively be constructed by a continuously long straight tube made of relatively low conductive material, like chromium, titanium on which the side feed lines 440 are physically and electrically connected in sequence with equal size/length segments of the antenna 420 between the adjacent feed lines. Each segment of the continuously long straight tube is effectively a sub-antenna so that the tailored antenna 420 is still effectively constructed by multiple phase-shifted sub-antennas connected in series. The grounded center conductor 410 and the grounded current generator 200 are all connected together just as the grounded outer conductor 110 is connected to the grounded current generator 200 in the first embodiment.

Figure 1A:
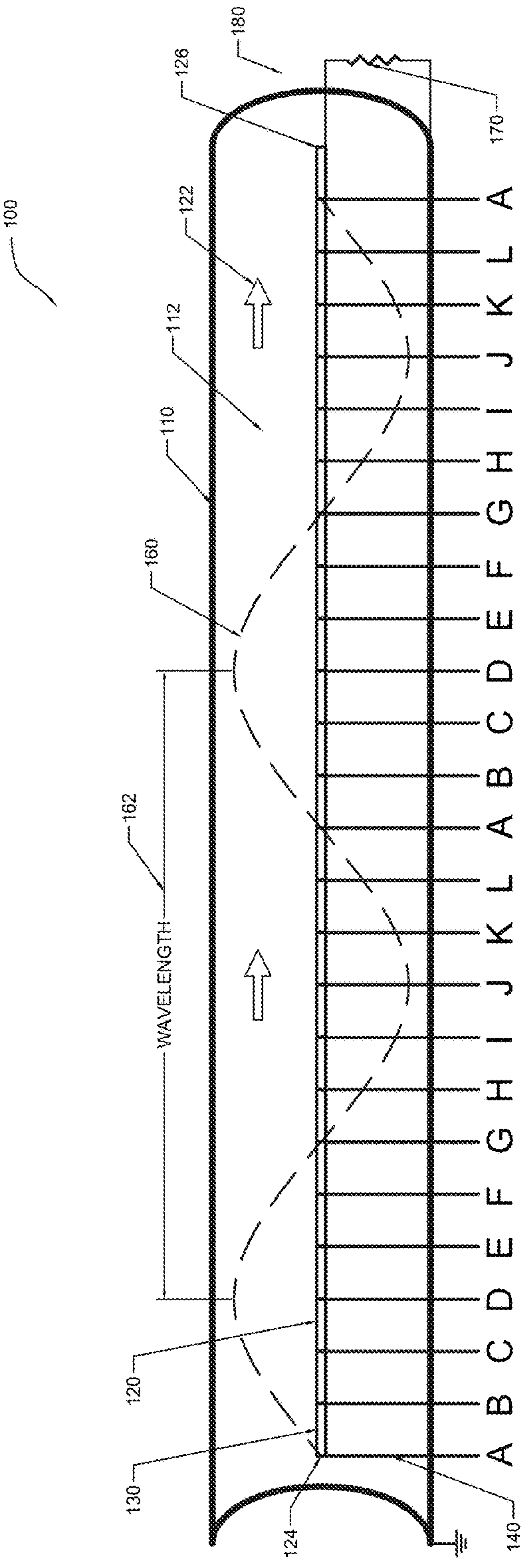
FIGS. 1A, 3A and 4A depict modifications to the coaxial waveguides of FIGS. 1, 3 and 4, respectively. These modified, coaxial waveguides are the same as FIGS. 1, 3 and 4, respectively, except that the end loads connected to the endings of the emitting antennas of the waveguides and the opposite ends of the conductors of the waveguides are not connected to ground, but are connected to each other.
Figure 3A:
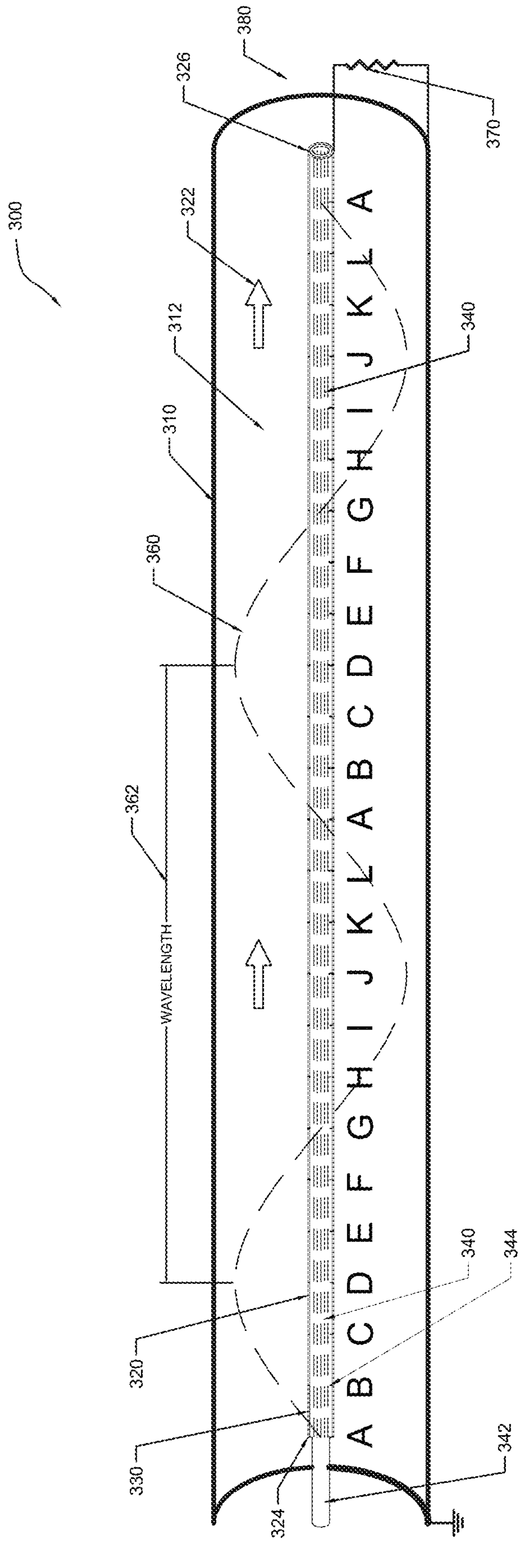
Figure 4A:
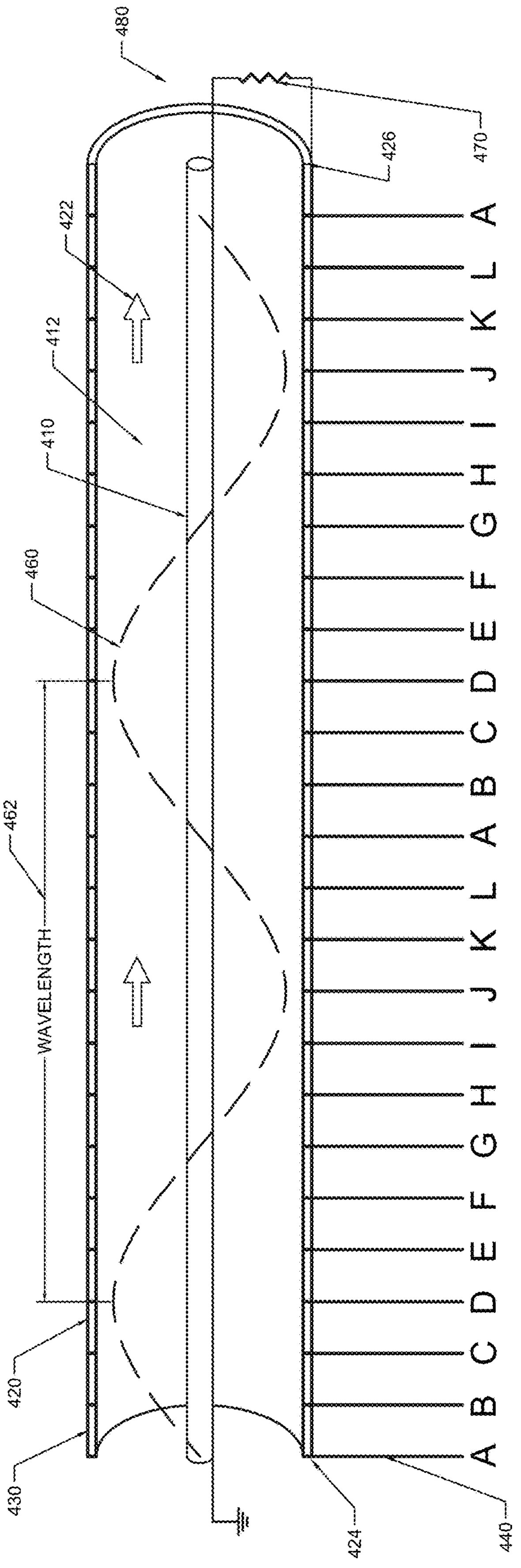

FIGS. 1A, 3A and 4A depict modifications to the coaxial waveguides of FIGS. 1, 3 and 4, respectively. These modified, coaxial waveguides are the same as FIGS. 1, 3 and 4, respectively, except that the end loads connected to the endings of the emitting antennas of the waveguides and the opposite ends of the conductors of the waveguides are not connected to ground, but are connected to each other.

Parallel Plate Waveguides

Figure 5:
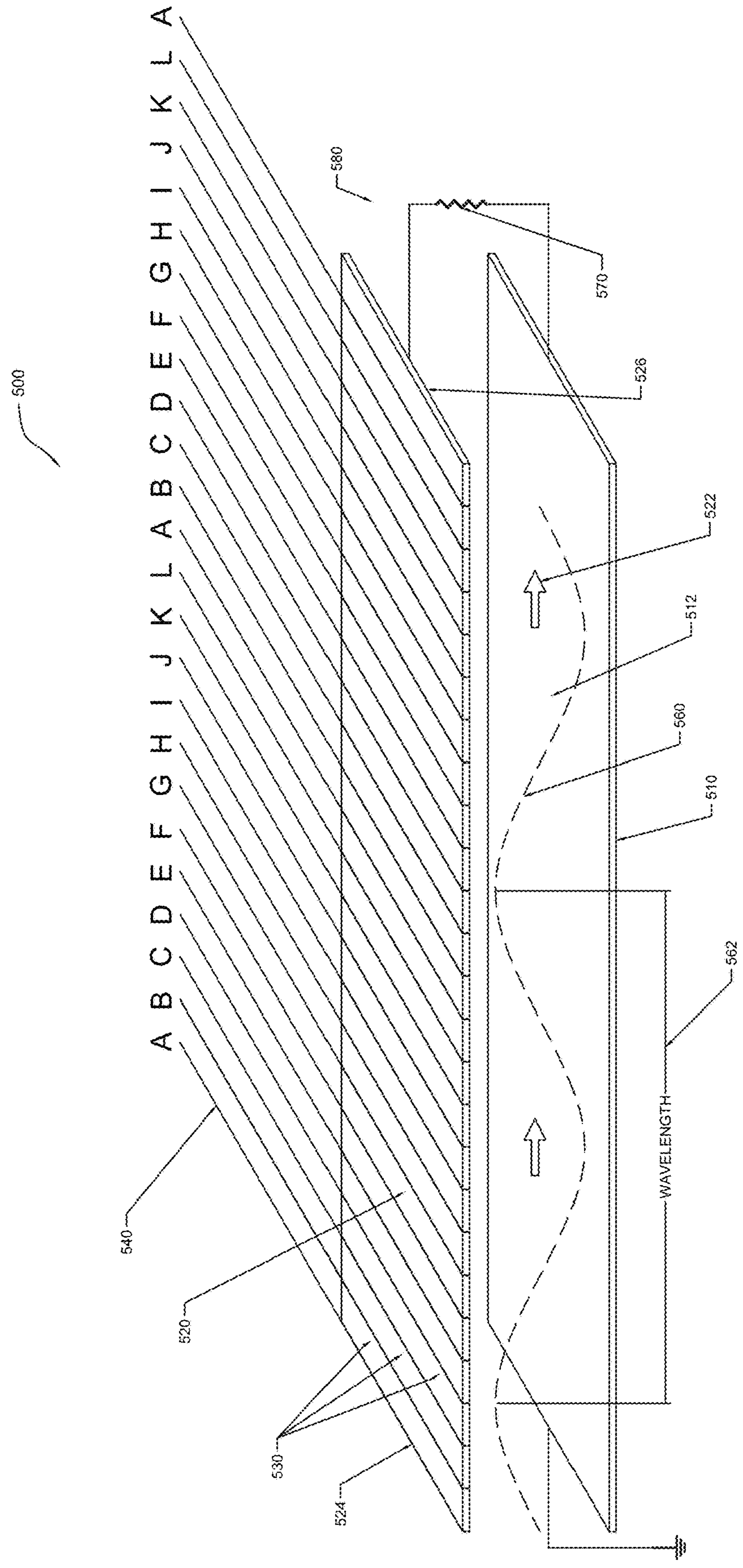
FIG. 5 is a perspective view of an exemplary embodiment of a parallel-plate waveguide according to the present invention and a tailored electromagnetic (EM) wave propagating within the waveguide.

A parallel-plate waveguide 500 depicted in FIG. 5 and a multiple phase-shifted sinewave current generator 200 depicted in FIG. 2 jointly constitute a system for efficiently generating or originating tailored EM waves having lower velocities than the speed of EM waves in free space according to another exemplary embodiment of the present invention.

Referring to FIG. 5, there is shown a perspective view of an exemplary embodiment a parallel-plate waveguide 500, including a ground plate 510 and a tailored transmitting antenna plate 520, which are two of three main parts of a system according to the present invention. FIG. 5 also shows in broken lines a tailored EM wave 560 which originates and propagates within the waveguide 500.

The parallel-plate waveguide 500 may be an open or closed, rectangular structure having an internal space 512 which may be maintained in vacuum, while outside the waveguide 500 is free space 580. The particular waveguide structure 500 in FIG. 5 is an open, rectangular structure. A long, straight, planar, conductive plate as a ground plate 510 of the waveguide 500 may be a conductor made of highly conductive material, like copper, aluminum, etc. forming low resistance. Herein, such conductor made of highly conductive material will be referred to as "first conductor".

The tailored transmitting antenna plate 520 may be disposed in parallel to and spaced from the ground plate 510, extends along the longitudinal direction of the waveguide and may be shaped as an elongate straight conductive plate functioning as a signal plate of the waveguide 500. There between the ground plate 510 and the tailored transmitting antenna plate 520 define the internal space 512 where the tailored EM wave 560 propagates, which internal space may be maintained in vacuum. According to an important aspect of the present invention, the tailored transmitting antenna plate 520 may be constructed electrically and mechanically using three or more phase-shifted sub-antennas 530 connected in series. The depicted transmitting antenna plate 520 includes twenty five (25) sub-antennas 530 in total, with twelve (12) of the sub-antennas 530 in one cycle of the originated EM wave 560. Every sub-antenna plate 530 may be identical and in the shape of a short piece of straight plate made of either relatively low conductive material, like chromium, titanium, etc. or highly conductive material, like copper, aluminum, etc., so that the sub-antenna plates will each have relatively high resistance. Herein, such conductive material will be referred to as "second conductor". Being relative high resistance, each sub-antenna plate 530 may have voltage potential difference due to some electrical resistance of the material. All of the sub-antennas 530 are physically and electrically connected in series, and collectively construct a long straight, planar plate in series as the tailored transmitting antenna plate 520 that can carry electric current of the originated EM wave from a beginning point or first end 524 to an ending point or opposite end 526 of the antenna plate 520.

The third main part of the system according to the present invention for efficiently generating or originating tailored EM waves having lower velocities than the speed of EM waves in free space may be the same unique sinewave current generator 200 shown in FIG. 2 which has already been discussed in relation to the systems involving coaxial waveguides as shown in FIGS. 1, 1A, 3, 3A, 4, 4A. The generator 200 functions the same in combination with the parallel plate waveguides according to exemplary embodiments of the present invention as it does in relation to the coaxial waveguides according to exemplary embodiments of the present invention as discussed above. Again, the generator 200 generates multiple phase-shifted sinewave currents and respectively inputs such phase-shifted sinewave currents to the sub-antennas 530. The sub-antennas may be electrically connected to the sinewave current generator by respective side feed lines 540, as shown in FIG. 5. The waveguide ground plate 510 and the current generator 200 may be connected to ground, and are electrically connected together via a resistive load 570.

As shown in FIG. 5, current outputs from the generator 200 connect and input the sinewave current to the tailored antenna plate 520 on each of the sub-antennas 530 through the respective feed lines 540, which may be placed in a side of the antenna plate 520 as shown in FIG. 5. The outputs of the sinewave current generator 200 may each have the same amplitude, but the outputs have phase-shifted sequences such as A, B, C, . . . L. In this embodiment, the intervals of phase-shift on all input sinewave currents are the same, such as 30° for twelve sub-antennas in one cycle as illustrated in FIG. 5, 120° for an antenna plate having only three sub-antennas in one cycle, etc. The smaller the interval of phase-shift is, the better the tailored EM wave 560 in terms of fewer harmonics. The power supply 236 may supply power to the main signal generator 234 with a selected single frequency at a time. The main signal generator 234 provides an oscillating sinewave current to all phase shifters 230 which sequentially shift a phase of the sinewave currents at equal intervals 232 between adjacent sinewave currents in one cycle. The current outputs of the current generator 200 are labeled A, B, C . . . L.

When the sub-antennas 530 receive the sinewave currents in phase-shifted sequences, the tailored antenna plate 520, consisting of the multiple sub-antennas 530, collectively originates and forms the tailored EM wave 560 within the parallel-plate waveguide 500. The internal space 512 of the waveguide 500 may be maintained in vacuum, in which case the traveling or propagating speed of the tailored EM wave 560 is its effective velocity 522. A physical distance on the tailored antenna plate 520 between two of the sub-antennas 530 with same phase shift defines or determines an effective wavelength 562 of the tailored EM wave 560. The effective wavelength 562 is advantageously selectable by design of the tailored antenna plate 520 and is independent of the frequency and the effective velocity 522 of the tailored EM wave 560. The length of the waveguide 500 should be at least twice as long as the effective wavelength 562 to minimize harmonic frequencies. In the depicted embodiment the tailored antenna plate 520 includes twenty five (25) sub-antennas 530, and hence is more than twice as long as the effective wavelength 562. Each of the sub-antenna plates 530 has some electrical resistance, and such resistance permits and builds up voltage potential difference between adjacent ones of the sub-antennas. However, the electrical resistance should be in a limited range to avoid possible problems. If too little electrical resistance were between the adjacent sub-antennas, adjacent phase-shifted currents could be distorted, whereas if too much electrical resistance were between the adjacent sub-antennas, the current flow of the tailored EM wave could be limited.

The tailored EM wave 560 exists in near field within the parallel-plate waveguide 500 configuration similar to a common parallel-plate waveguide. The parallel-plate waveguide 500 includes the tailored antenna plate 520 which is disposed along the longitudinal direction of the waveguide and carries alternating sinewave current of the originated/generated, tailored EM wave 560 from the beginning point 524 to the ending point 526 of the antenna plate, where an end load 570 with appropriate or matched impedance is connected. Again, the tailored antenna plate is constructed physically and electrically by multiple sub-antennas in series, where each of the sub-antennas produces a section of the tailored EM wave. An electric field is generated towards and perpendicular to the ground plate and a magnetic field is generated in parallel to the two plates and in transverse direction to the parallel-plate waveguide 500 in TEM mode by the alternating sinewave current on the tailored antenna plate 520. This results from the tailored EM wave 560 that propagates within the waveguide 500 towards the end load 570. Because the direction of propagation vector, or Poynting vector, of the EM wave 560 is always orthogonal to both electric field and magnetic field, the direction of propagation is in the longitudinal direction of the waveguide. Therefore, the present invention is advantageously different from the conventional systems and methods of the Background Art discussed herein because there is no directional EM energy loss in the tailored EM wave 560 in the internal space 512 inside the waveguide 500. Also, when the internal space 512 of the parallel-plate waveguide 500 in the depicted embodiment is maintained in vacuum, the present invention is advantageously different from the conventional systems and methods of the Background Art discussed herein because no dielectric EM energy loss occurs in vacuum. The tailored EM wave 560 cannot exist outside the waveguide 500 in free space 580.

The present invention uniquely, efficiently generates or originates tailored EM waves 560 having lower velocities than the speed of EM waves wave in free space. In other words, the present invention efficiently originates or generates a relatively slow EM wave. As discussed above, the efficiency is achieved because there is no directional EM energy loss in the tailored EM wave 560 which longitudinally propagates within the parallel-plate waveguide 500, and because there is no dielectric EM energy loss based on use of vacuum as the dielectric medium within the internal space 512 of the parallel-plate waveguide 500 according to the embodiment of the present invention, rather than denser dielectric materials which are conventionally used to slow the velocity of an electromagnetic wave. Just as an EM wave passing through a dielectric medium within a conventional waveguide has slower phase velocity than the speed of light (c) in free space, the effective velocity ($v_e$) 522 of the propagating tailored EM wave 560 in vacuum within the internal space 512 of the parallel-plate waveguide 500 is the frequency (f) times the effective wavelength ($\lambda_e$). That is, $v_e=f\cdot\lambda_e$ and may be much smaller than the speed of light (c) in free space. Common use of a dielectric medium that is denser than vacuum, such as metamaterial dielectric medium, to slow down the velocity of EM wave inside a waveguide will typically consume some of the energy of the EM wave. In contrast, the present embodiment uses vacuum as the dielectric medium within the waveguide 500 because vacuum as the dielectric medium doesn't consume energy of EM wave.

The tailored EM wave generated using the system and method of the present invention has an effective phase velocity 522 which may be designed several orders of magnitude smaller than the speed of light (c) in free space, e.g., 10 to 100,000 times slower. As an example when the internal space 512 in the waveguide is maintained in vacuum, if the frequency of the multiple phase-shafted sinewave current generator 200 is set as f=30 KHz and the effective wavelength of the parallel-plate waveguide 500 is set as $\lambda_e$=1 m, the effective velocity 522 would be $v_e=f\cdot\lambda_e=30000\times1=3\times10^4$ m/s.

By comparison to an EM wave in free space, which travels at the speed of light c, this would be c (speed of light)/$v_e=3\times10^8/3\times10^4=10000$ Hence, the effective phase velocity 522 ($v_e$) of the tailored EM wave in this example is 10,000 times slower than the speed of light.

The parallel-plate waveguide 500 of FIG. 5 may be modified in various ways. For example, the tailored antenna plate 520 need not be constructed of multiple, separate sub-antennas 530 joined sequentially together in a linear arrangement. According to a possible modification, the tailored antenna plate 520 can also be constructed by a continuously long straight, planar plate made of the second conductor, which has relatively high resistance, on which the feed lines are physically and electrically connected in sequence with equal segment lengths between the adjacent feed lines. Each segment of the continuously long straight, planar plate is effectively a sub-antenna plate so that the tailored antenna plate 520 according to this modification would still be effectively constructed by multiple phase-shifted sub-antennas connected in series. Also, the internal space 512 of the parallel-plate waveguide 500 is preferably maintained in vacuum for minimizing energy loss. However, any dielectric medium other than vacuum may be used to fill the internal space 512 within the parallel-plate waveguide 500 according to the present invention, even if this would result in some dielectric energy loss.

Figure 6:
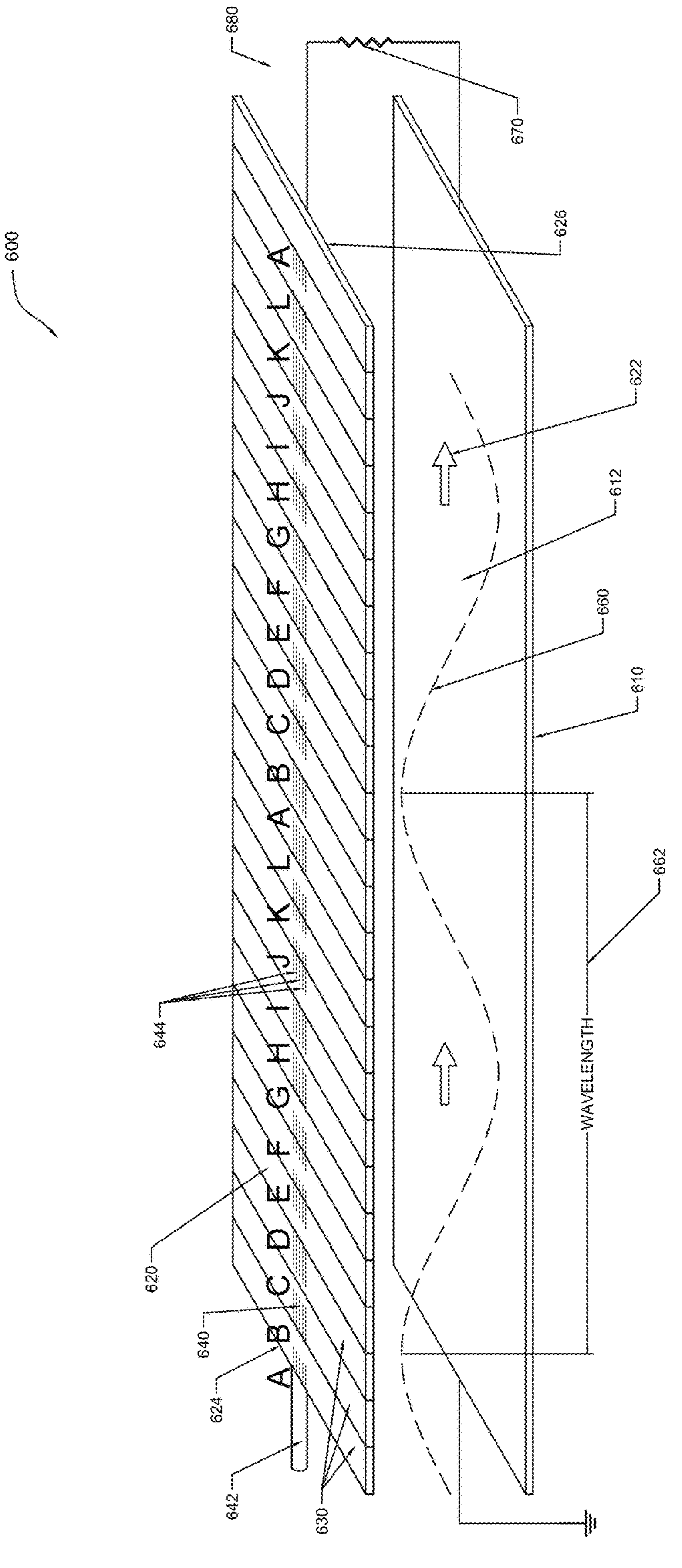
FIG. 6 is a perspective view of another exemplary embodiment of a parallel-plate waveguide according to the present invention and a tailored electromagnetic (EM) wave propagating within the waveguide, wherein the tailored antenna is hollow.

Referring to FIG. 6 there is shown a parallel-plate waveguide 600 according to another illustrative embodiment of the present invention. Primary differences between this embodiment and the embodiment of FIG. 5 pertain to a hollowed structure of a tailored transmitting antenna plate 620 and feed lines 640 that provide multiple phase-shifted sinewave current outputs to sub-antennas 630 of the tailored transmitting antenna plate 620.

FIG. 6 is a perspective view of the parallel-plate waveguide 600 according to this embodiment of the present invention, wherein a tailored EM wave 660 that originates and propagates in the waveguide 600 is shown in broken lines. The parallel-plate waveguide 600 includes many features which are common to the parallel-plate waveguide 500 of the embodiment of FIG. 5, including that: internal space 612 of the waveguide may be vacuum; outside the waveguide 600 is free space 380; a ground plate 610 of the waveguide 600 is the first conductor, which has low resistance such as the ground plate 510 in FIG. 5, in shape of a long straight, planar plate; a tailored transmitting antenna plate 620 is in the shape of an elongate straight, planar plate functioning as a signal plate of the parallel-plate waveguide 600 and is constructed electrically and mechanically by at least three, phase-shifted sub-antennas 630 in series; the antenna plate 620 as illustrated includes twelve sub-antennas 630 in one cycle; all of the sub-antennas 630 are identical in shape and made of the second conductor, which has relatively high resistance as the sub-antennas 530 in FIG. 5, so that each sub-antenna plate 630 can have voltage potential difference due to some electrical resistance of the material; all sub-antennas 630 are physically and electrically connected in series collectively forming a long straight, planar plate such as the tailored antenna plate 520 that can carry electric current through from a beginning point 624 of the antenna plate to an ending point 626 of the antenna plate where an end load 670 is connected.

The tailored transmitting antenna plate 620 is different from the tailored transmitting antenna plate 520 of the embodiment of FIG. 5 in the following respects. First, the antenna plate 620 is hollow to some extent and each of the sub-antennas 630 forming the antenna plate is of a short piece of straight hollowed plate. Second, feed lines 640, which respectively provide phase-shifted sinewave current outputs from a multiple phase-shifted sinewave current generator such as the generator 200 in FIG. 2, are bundled together 642 and are disposed inside the hollow tailored antenna plate 620. The bundled feed lines 642 may enter the hollow antenna plate 620 from one end of the antenna plate nearest to a beginning point 624 of the antenna plate, rather than through a side of the waveguide as in FIG. 5, and then extend through the hollow antenna plate to the ending point 626 of the antenna plate so that electric field together sums zero inside the linear, hollow tailored antenna plate 620. Inside the hollow antenna plate each of the centrally disposed, bundled feed lines 640 branches out as individual feed lines 644 which are respectively, electrically connect to the sub-antenna plates 630 by phase-shift sequence A, B, C . . . L, similar to the respective connections of the side feed lines 540 to the phase shifted sub-antennas 530 in FIG. 5. The grounded outer conductor plate 610 and the grounded current generator 200 are connected together just as the grounded outer conductor 510 in FIG. 5 may be connected to the grounded current generator 200.

As a modification to this embodiment, the tailored transmitting antenna plate 620 may alternatively be constructed by a continuously long straight hollowed plate made of the second conductor, which has relatively high resistance, on which feed lines providing phase-shifted sinewave current outputs from the generator 200, such as the individual feed lines 644, are physically and electrically connected in sequence with equal length/size segments of the continuously long straight hollowed plate antenna plate between the adjacent feed lines. Each segment of the modified, continuously long straight hollowed plate antenna plate is effectively a sub-antenna plate so that the tailored antenna plate 620 is still effectively constructed by multiple phase-shifted sub-antennas connected in series.

An effective wavelength 662 is defined and calculated the same as that of the effective wavelength 562 in FIG. 5. An effective velocity 622 of the slowed EM wave is defined and calculated as same as that of the effective velocity of 522 in FIG. 5.

Figure 7:
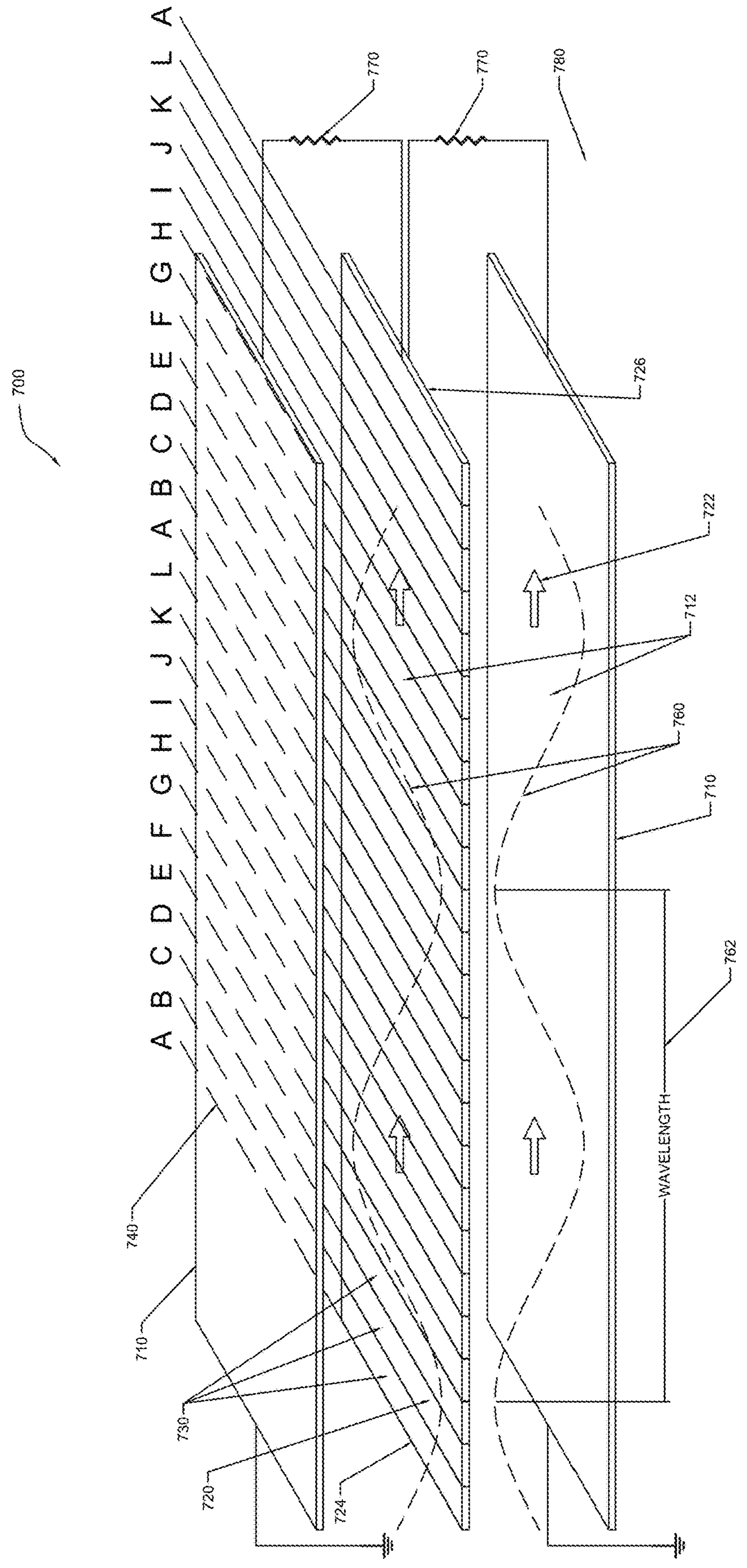
FIG. 7 is a perspective view of another exemplary embodiment of a parallel-plate waveguide according to the present invention and a tailored electromagnetic (EM) wave propagating within the waveguide, wherein the tailored antenna is sandwiched between two ground plates.

Referring to FIG. 7 there is shown another parallel-plate waveguide 700, technically called stripline waveguide, according to another illustrative embodiment of the present invention. Primary differences between this embodiment and the embodiment of FIG. 5 pertain to the structure of the waveguide that has a tailored transmitting antenna plate 720 sandwiched and spaced between two ground plates 710. Essentially, there are two parallel defined internal spaces 712, 712 for tailored EM waves 760 to propagate that are respectively defined and contained between the tailored transmitting antenna plate 720 and each of the two ground plates 710, rather than a single internal space 512 space for tailored EM wave 560 in the parallel-plate waveguide 500 of the embodiment of FIG. 5. In this embodiment the tailored transmitting antenna plate 720 forms a signal plate of the waveguide 700 and two other long straight conductive plates form two ground plates 710, 710 extending linearly along the longitudinal direction of the waveguide 700.

FIG. 7 is a perspective view of the parallel-plate waveguide 700 according to this embodiment of the present invention, wherein tailored EM waves 760, 760 that originate in the waveguide 700 are shown in broken lines. The parallel-plate waveguide 700 includes many features which are common to the parallel-plate waveguide 500 of the embodiment of FIG. 5, including that: internal spaces 712, 712 of the waveguide 700 may be maintained in vacuum; outside the waveguide 700 is free space 780; the ground plates 710 of the waveguide 700 are made of the first conductor, which has low resistance such as the ground plate 510 in FIG. 5; the tailored transmitting antenna plate 720 is elongate, straight, planar and is constructed electrically and physically by at least three, phase-shifted sub-antennas 730 in series; the illustrated embodiment includes twelve sub-antennas 730 in one cycle; all of the sub-antennas 730 are identical and made of the second conductor, which has relatively high resistance such as the sub-antennas 530 in FIG. 5, so that each sub-antenna 730 can have a voltage potential difference due to some electrical resistance of the material; all of the sub-antennas 730 are physically and electrically connected in series collectively construct an elongate plate such as the tailored antenna plate 520 that can carry electric current through from a beginning point 724 to an ending point 726 where two end loads 770, 770 are connected; and all of the sub-antennas 730 are electrically connected by side feed lines 740 to a multiple phase-shifted sinewave current generator, such as the generator 200 in FIG. 2.

The tailored transmitting antenna plate 720 with feed lines 740 from a side of the antenna plate 720 is made exactly the same as that of the tailored transmitting antenna plate 520 with the feed lines 540 from a side of the antenna plate 520 of the embodiment in FIG. 5. Each of the ground plates 710 are also made exactly same as that of the ground plate 510 of the embodiment in FIG. 5. The antenna plate 720 is connected to the current generator 200 by the input sequence A, B, C . . . L through feed lines 740.

An effective wavelength 762 of the slowed EM waves 760 is defined and calculated the same as that of the effective wavelength 562 in FIG. 5. An effective velocity 722 is defined and calculated as same as that of the effective velocity of 522 in FIG. 5.

Figure 8:
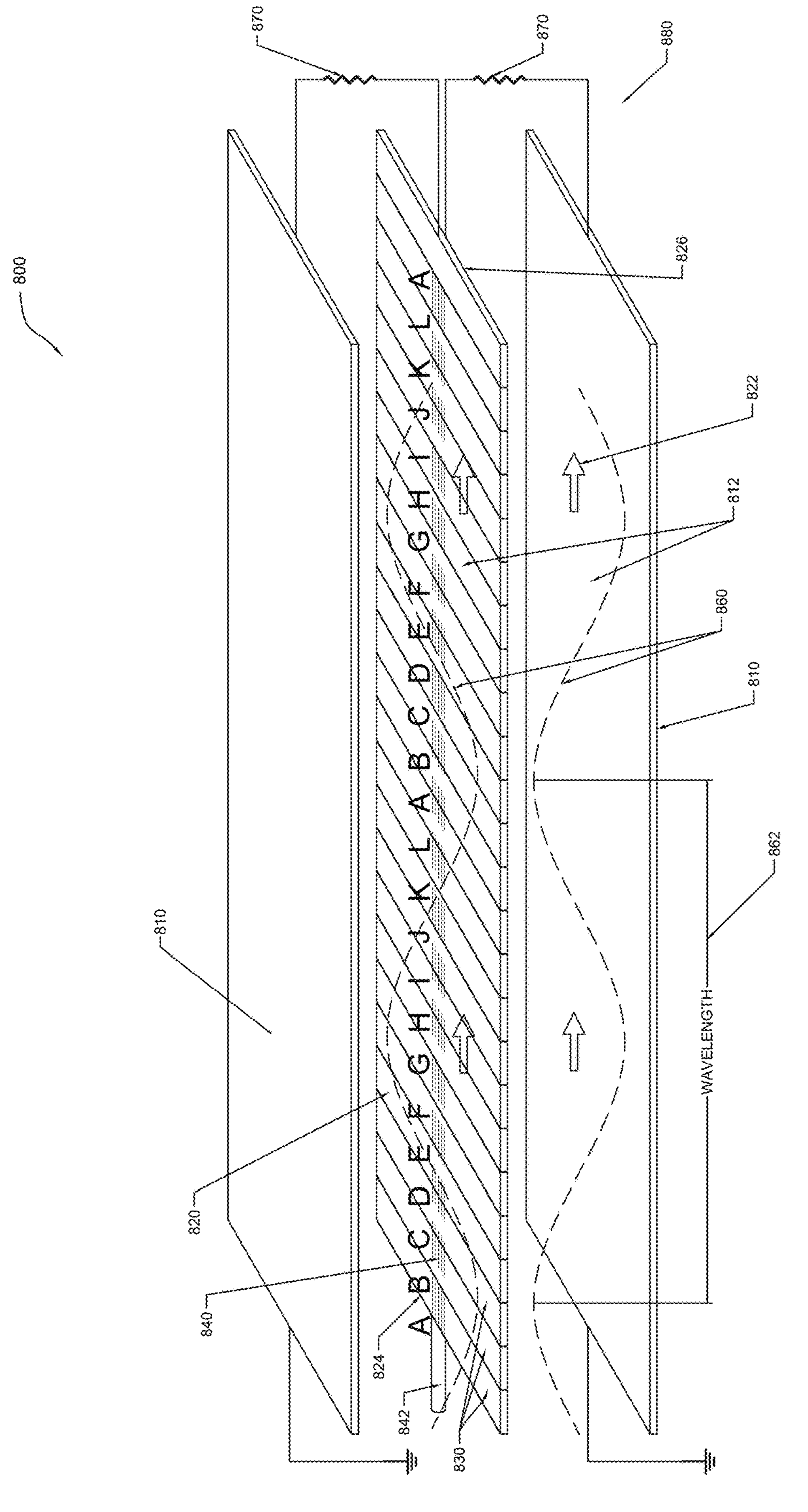
FIG. 8 is a perspective view of another exemplary embodiment of a parallel-plate waveguide according to the present invention and a tailored electromagnetic (EM) wave propagating within the waveguide, wherein the waveguide combines aspects of the waveguides of FIGS. 6 and 7.

Referring to FIG. 8 there is shown another parallel-plate waveguide 800, technically called a Stripline waveguide, according to another illustrative embodiment of the present invention. This waveguide 800 combines a hollowed characteristic of the waveguide 600 according to the second embodiment shown in FIG. 6 and a sandwiched characteristic of the waveguide 700 according to the embodiment shown in FIG. 7. Primary differences between this embodiment and the embodiment in FIG. 6 pertain to the structure of the waveguide whereby it has a tailored, hollow transmitting antenna plate 820 sandwiched and spaced between two ground plates 810, 810. Essentially, there are two parallel defined internal spaces 812, 812 for tailored EM waves 860, 860 to propagate that are respectively defined and contained between the tailored transmitting antenna plate 820 and each of the two ground plates 810, 810, rather than a single internal space 612 for the tailored EM wave 660 in the parallel-plate waveguide 600 of the embodiment of FIG. 6. In this embodiment the tailored transmitting antenna plate 820 forms a signal plate of the waveguide 800 and the two long straight conductive plates form two ground plates 810, 810 extending linearly along the longitudinal direction of the waveguide 800.

FIG. 8 is a perspective view of the parallel-plate waveguide 800 according to this embodiment of the present invention, wherein tailored EM waves 860, 860 that originate in the waveguide 800 are shown in broken lines. The parallel-plate waveguide 800 includes many features which are common to the parallel-plate waveguide 600 of the embodiment of FIG. 6, including that: internal spaces 812, 812 of the waveguide 800 may be maintained in vacuum; outside the waveguide 800 is free space 880; the ground plates 810, 810 of the waveguide 800 are made of the first conductor, which has low resistance as the ground plate 510 in FIG. 5; the tailored transmitting antenna plate 820 is elongate, straight, planar and are constructed electrically and physically by at least three, phase-shifted sub-antennas 830 in series; the illustrated embodiment includes twelve sub-antennas 830 in one cycle; all of the sub-antennas 830 are identical and made of the second conductor, which has relatively high resistance such as the sub-antennas 530 in FIG. 5, so that each sub-antenna 830 can have voltage potential difference due to some electrical resistance of the material; all of the sub-antennas 830 are physically and electrically connected in series collectively construct an elongate plate as the tailored antenna plate 820 that can carry electric current through from a beginning point 824 to an ending point 826 where two end loads 870, 870 are connected between the antenna plate 820 and the ground plates 810, 810, respectively; and all of the sub-antennas 830 are electrically connected by feed lines 840 that are bundled together 842 and may go through from the beginning end of the antenna plate 820, are disposed inside the hollow tailored antenna plate 820 and are connected to a multiple phase-shifted sinewave current generator such as the generator 200 in FIG. 2.

The tailored transmitting antenna plate 820 with feed lines 840 through the hollowed antenna plate 820 may be made exactly the same as that of the tailored transmitting antenna plate 620 with the bundled feed lines 840 extending through the hollowed antenna plate 820 similar to the arrangement of the embodiment in FIG. 6. The ground plates 810, 810 may be made exactly same as that of the ground plate 610 of the embodiment in FIG. 6. The antenna plate 820 may be connected to the current generator 200 by the input sequence A, B, C . . . L through the bundled feed lines 840.

An effective wavelength 862 of the EM waves 860, 860 is defined and calculated the same as that of the effective wavelength 662 in FIG. 6. An effective velocity 822 is defined and calculated as same as that of the effective velocity of 622 in FIG. 6.

The present invention is not limited to the systems including the coaxial and parallel plate waveguides and the current generator 200 according to the exemplary embodiments of the invention discussed above. Other embodiments according to the present invention may, for example, may include multiple tailored antenna plates with multiple ground plates in various arrangements as many structures of microstrip waveguides according to the present invention.

As will be understood by a skilled artisan, all embodiments and descriptions of the present invention may be applied on to miniature physical sizes like Micro-Electro-Mechanical System (MEMS) or printed circuit boards (PCB's) or even made on to semiconductor chips.

The present invention is not limited in its application to the details of constructions and to the dispositions of the components set forth in the foregoing description or illustrated in the appended drawings in association with the present illustrative embodiments of the invention. The present invention is capable of being structured in other embodiments and of being practiced and carried out in various ways. In addition, it is to be understood that the phraseology and terminology employed herein are for the purposes of illustration and example, and should not be regarded as limiting. As such, those skilled in the art will appreciate that the concepts, upon which this disclosure is based, may readily be utilized as a basis for the designing of other structures, methods and systems for carrying out the several purposes of the present invention. It is important, therefore, that the scope of the claims appended hereto be regarded-interpreted as including such equivalent constructions.

I claim:

1. A system for efficiently generating a tailored electromagnetic (EM) wave having a lower velocity than the speed of electromagnetic waves in free space, comprising:

a parallel-plate waveguide which extends linearly; and a sinewave current generator, wherein the parallel-plate waveguide includes at least one ground plate and at least one tailored transmitting antenna plate disposed apart and parallel to each other and an internal space is defined therebetween, the ground plate is formed from a first conductor, the tailored transmitting antenna plate is includes at least three phase-shifted sub-antennas connected physically and electrically in series, each of the sub-antennas being formed of a second conductor, and the sinewave current generator generates multiple phase-shifted sinewave currents which are respectively input to the sub-antennas.

2. The system according to claim 1, wherein the first conductor is made of highly conductive materials which forms a first resistance.

3. The system according to claim 1, wherein the second conductor is made of one or more conductive materials which form resistance that is greater than the first resistance.

4. The system according to claim 1, wherein the parallel-plate waveguide and the sinewave current generator are configured such that when the sub-antennas receive the sinewave currents in phase-shifted sequences from the sinewave current generator, the tailored transmitting antenna plate originates and forms the tailored EM wave having the lower velocity than the speed of electromagnetic waves in free space.

5. The system according to claim 4, wherein the tailored EM wave having the lower velocity than the speed of electromagnetic waves in free space propagates along the tailored transmitting antenna plate in the internal space.

6. The system according to claim 4, wherein the tailored EM wave having the lower velocity than the speed of electromagnetic waves in free space has an effective wavelength that is equal to the physical distance between two of the sub-antennas having a same phase-shift of the phase-shifted sinewave currents.

7. The system according to claim 6, wherein a length of the parallel-plate waveguide is at least as long as the effective wavelength of the tailored EM wave.

8. The system according to claim 1, further comprising at least one end load which is connected to the tailored transmitting antenna plate.

9. The system according to claim 1, wherein the multiple phase-shifted sinewave currents have a same amplitude and a same interval between adjacent sinewave currents at a single frequency.

10. The system according to claim 1, wherein the phase-shifted sub-antennas are identical to each other.

11. The system according to claim 1, wherein the phase-shifted sub-antennas have equal segment length in a longitudinal direction of the tailored transmitting antenna plate.

12. The system according to claim 1, wherein the sinewave current generator inputs the multiple phase-shifted sinewave currents to the sub-antennas through a side of the parallel-plate waveguide.

13. The system according to claim 1, wherein the tailored transmitting antenna plate has a hollow space defined therein and the sinewave current generator inputs the multiple phase-shifted sinewave currents to the sub-antennas through the hollow space.

14. The system according to claim 1, wherein the internal space is maintained in vacuum.

15. The system according to claim 1, wherein the internal space is not maintained in vacuum.

16. The system according to claim 1, wherein a body of the parallel-plate waveguide has a rectangular cross-sectional shape.

17. The system according to claim 1, wherein the sinewave current generator generates multiple sinewave currents with a same frequency and amplitude, but different phase-shift.

18. The system according to claim 1, wherein the sinewave current generator determines a frequency of the tailored EM wave is determined by, and the tailored transmitting antenna plate determines a wavelength of the tailored EM wave.

19. A system for efficiently generating a tailored electromagnetic (EM) wave having a lower velocity than the speed of electromagnetic waves in free space, comprising:

a parallel-plate waveguide which extends linearly, wherein a tailored transmitting antenna plate which is constructed physically and electrically by at least three phase-shifted sub-antennas connected in series; and a sinewave current generator which generates multiple phase-shifted sinewave currents which are respectively input to the sub-antennas, wherein each of the sub-antennas produces a section of the tailored EM wave inside the waveguide.

20. A system for efficiently generating a tailored electromagnetic (EM) wave having a lower velocity than the speed of electromagnetic waves in free space, comprising:

a waveguide which extends linearly; and a sinewave current generator, wherein the waveguide includes a conductor is made of a highly conductive material and a tailored transmitting antenna plate which electrically has at least three phase-shifted sub-antennas connected in sequence with equal segment length between adjacent feed lines; and a sinewave current generator which generates multiple phase-shifted sinewave currents which are respectively input to the sub-antennas through the feed lines.

* * * * *